(12) United States Patent
Zemany

(10) Patent No.: US 7,852,256 B2
(45) Date of Patent: Dec. 14, 2010

(54) THROUGH THE-WALL MOTION DETECTOR WITH IMPROVED ANTENNA

(75) Inventor: Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 43 days.

(21) Appl. No.: 11/919,269

(22) PCT Filed: Oct. 11, 2006

(86) PCT No.: PCT/US2006/040032

§ 371 (c)(1),
(2), (4) Date: Oct. 25, 2007

(87) PCT Pub. No.: WO2007/047418

PCT Pub. Date: Apr. 26, 2007

(65) Prior Publication Data

US 2009/0033539 A1 Feb. 5, 2009

Related U.S. Application Data

(60) Provisional application No. 60/726,959, filed on Oct. 14, 2005.

(51) Int. Cl.
*G01S 13/04* (2006.01)
*G01S 13/88* (2006.01)
*G01S 7/02* (2006.01)
*G01S 13/00* (2006.01)
*G01S 13/89* (2006.01)

(52) U.S. Cl. ............................. 342/22; 342/27; 342/28; 342/118; 342/127; 342/175

(58) Field of Classification Search ................... 342/21, 342/22, 27, 28, 82, 89, 90, 118, 124, 159, 342/175, 176, 179, 190–198, 1–11, 127, 342/368–377; 343/700 MS, 720, 767–771, 343/789, 793, 795
See application file for complete search history.

(56) References Cited

U.S. PATENT DOCUMENTS 3,775,765 A * 11/1973 Di Piazza et al. ............. 342/22

(Continued)

FOREIGN PATENT DOCUMENTS

EP  1 478 050 A1  11/2004

(Continued)

OTHER PUBLICATIONS

Merrill I. Skolnik, 7.9 Radomes, "Introduction to Radar Systems" 1981, McGraw-Hill, XP007913796, ISBN: 0-07-066572-9, pp. 264-271.

*Primary Examiner*—Bernarr E Gregory
(74) *Attorney, Agent, or Firm*—Daniel J. Long; Robert K. Tendler

(57) ABSTRACT

A flat panel antenna used at a wall in a through-the-wall CW radar application is spaced from the wall by a half wavelength to eliminate the effects of energy reflected by the wall back to the antenna. In one embodiment, a ½-wavelength dielectric absorbing material insert is placed adjacent the flat panel antenna, which allows the flat panel antenna to be pressed against the wall for antenna stabilization, with the index of refraction of the material desirably being 3.

19 Claims, 3 Drawing Sheets

U.S. PATENT DOCUMENTS 4,161,731 A * 7/1979 Barr ............................ 342/22
4,670,754 A * 6/1987 Zacchio ...................... 342/124
4,725,842 A * 2/1988 Mayberry .................. 342/198
5,012,248 A * 4/1991 Munro et al. ................. 342/22

FOREIGN PATENT DOCUMENTS

JP 58035478 A * 3/1983 .................. 342/22

* cited by examiner

THROUGH THE-WALL MOTION DETECTOR WITH IMPROVED ANTENNA

RELATED APPLICATIONS

This Application claims rights under 35 USC §119(e) from U.S. Provisional Application Ser. No. 60/726,959 filed Oct. 14, 2005, the contents of which are incorporated herein by reference.

This application is related to PCT Patent Application: US2004/30116 filed Sep. 14, 2004 by Paul D. Zemany, Jr. of Amherst, N. H. and Eldon Sutphin of Merrimack, N. H., entitled "Method and Apparatus for Through-the-Wall Motion Detection Utilizing CW Radar," the contents of which is incorporated herein by reference.

FIELD OF THE INVENTION

This invention relates to using CW radar to detect motion of objects behind a wall and more particularly to a system with an improved antenna for such use.

BACKGROUND OF THE INVENTION

Oftentimes it is desirable to be able to detect individuals within, for instance, a burning building or enemy combatants or troops behind a wall. Moreover, in some instances police can utilize through-wall sensing systems to be able to detect the presence of wanted individuals from a position outside the building.

Through-wall sensing can be used in military operations in urban terrain, for homeland security, for law enforcement and for fire departments. The need to sense behind walls is clear. It will be appreciated that the details of the mission and types of walls or obstructions dictate the design of the through-wall sensors.

The referenced patent application discloses the use of a directional antenna to project a majority of the energy in a given direction. In one embodiment, the radar is a single frequency radar, operating at 900 MHz, with a YAGI antenna, with 13 dB forward gain. While a YAGI antenna may be utilized in order to reduce back lobes and yet have a readily portable unit, the referenced patent application also discloses a flat panel antenna with conductive elements insulated from a ground plane that may be used to further reduce back lobes and is lighter and more easily transportable.

In many instances, for example when detecting moving objects behind dense walls made of brick or concrete, traditional flat panel antennas may not have adequate performance because a substantial amount of energy is reflected from the first wall surface.

What is therefore required is an improved antenna for a low cost, low power drain, compact unit that can be placed against the outside of a wall that can detect motion of individuals within the building and discriminate against inanimate objects.

More particularly, in the aforementioned patent application, what envisioned was a radar with a relatively large antenna. The antenna originally envisaged for this application was a YAGI antenna that was more than three feet long and had to be mounted on a tripod adjacent the wall through which motion was to be detected.

In order to provide a more compact antenna, a panel-type antenna was devised, which was placed against the wall to steady the antenna.

However, placing the antenna against the wall detuned the antenna and caused backward reflections that in essence swamped the radar's receiver. This required an extremely high dynamic range for the receiver of the radar.

Despite utilizing quad-type panel antennas that provide 12-13 dB of forward gain, the inverted and reflected waves at the antenna/wall interface caused considerable difficulties.

SUMMARY OF INVENTION

In order to optimize a through-the-wall motion detector system involving the detection of individuals moving behind a wall that employs a simple CW radar having a directional antenna, in one embodiment of the subject invention, a flat panel antenna is utilized in which the flat panel antenna is spaced from the wall by one-half wavelength. If the antenna is spaced from the wall by a half wavelength, the inverted signal reflected by the wall arrives 180° phase shifted with respect to the transmitted wave at a node at which the wave reflected at the wall is mixed with the outgoing wave in a phase cancellation process. The result is near-zero energy at the node. This means that the small amount of energy returned from a moving object behind the wall will be detected absent swamping from the wall return. The spacing in one embodiment is obtained through the utilization of a dielectric material insert placed between the antenna and the wall.

Put another way, the insert or spacer is designed to minimize the effect of the reflected energy at the antenna. Minimizing the RF reflected energy from the wall reduces the dynamic range requirement of the receiver and thus prevents overload of the receiver due to the strong wall reflection. The basic idea is to choose the spacer thickness such that the RF path from the antenna to the wall and back to the antenna results in RF reflected back is shifted by 180° relative to the transmitted energy.

The input to the receiver front end is sum of the wall reflection and the transmitter wave. With 180° of total phase shift, the two signals substantially cancel and this reduces the effect of the wall reflection. Without this cancellation, the wall reflection could overdrive the RF front end.

The desired thickness is obtained based on the following. The wall is dense so that there is a 180° phase shift as the RF is reflected. The phase shift of the signal traveling a distance D is given by 360*n*D/(wl) degrees where wl is the wavelength and n is the index of refraction of the spacer. The value of D can be selected so that the phase shift of the signal will have 180 degrees phase shift relative to the transmitted signal when at the wall. The reflection process will then produce a −180 degree phase shift resulting in zero phase shift in the signal just after reflection off the wall. Finally, in traveling back to the antenna from the wall, an additional 180-degree phase shift takes place. The result of these three steps cause the signal reflected back from the wall to be 180 degrees shifted relative to the transmitted signal.

It is noted that different spacer material can be used, with the index of refraction (n) of the material being the key parameter.

For the appropriate phase shift, the thickness would be lambda/(2*n). Thus for, example, for a 10 cm wavelength and n=2, the thickness would be 2.5 cm.

Put another way, it is possible to minimize the reflected wave from the wall by using a spacer that provides a 180-degree phase delay (one-half-wave thickness) between the antenna and the wall. To obtain the proper delay, the physical thickness of the spacer should be wl/(2*n).

In designing the flat panel antenna, one must account for the effect of the spacer. The spacer has the effect of lowering the resonant frequency of the antenna. Thus, to obtain the desired frequency the dimensions of the antenna are reduced.

The extent of the reduction increases with n. Larger n results on more reduction. However, it is possible to choose the antenna size to obtain the desired resonant frequency. Of coarse for n=1, there is no size change.

When one places the material having the desired thickness and n to provide 180 degrees of one way phase shift between the antenna and the wall, the effect of the wall reflection on the receiver is minimized and the detuning of the antenna caused by the near proximity of the wall is also minimized. The result is that the antenna remains on the desired frequency in spite of wall material type and the effect of RF reflected from the wall is significantly reduced. This results in better sensitivity to detect motion on the other side of the wall. At the same time that one obtains better sensitivity, one is stabilizing the antenna because one places the antenna with the intermediary material against the wall by hand such that there is no relative motion between the wall and the antenna.

In one embodiment, the material used is plastic foam having an index of refraction about 2. In practice, the material should have an index of less than the wall. Since walls may have n ranging from 1.5 to 10, values of between 2 to 5 are useful.

In terms of the improvement of results, one may obtain a factor of 10 increase in power through the wall. Thus, by inserting such a material for matching the antenna to the wall, one can obtain an order of magnitude better sensitivity.

In one embodiment, foam material is used that has a thickness of approximately three inches to make it effectively a half wavelength. At 900 MHz having a 33 cm free space wavelength, the preferred through-the-wall frequency, one has matching material thickness of about 8 centimeters for a spacer having n=2.

Because the returned signal from the moving object is relatively small and because the reflected signal from the wall is relatively large, one seeks to reduce the swamping effect as much as possible so that one does not have to have a wide dynamic range receiver.

In one operative test, moving objects behind a 12-inch thick concrete wall were detected at approximately 20 feet. This was accomplished using a quad-type panel antenna with four patches on it that are driven with a common phase with respect to each other to give the patch antenna about a 12- to 13-dB forward gain. The patches themselves are 5 by 7 centimeters and are spaced apart by a little under half a wavelength, for instance 0.8 wavelength.

Moreover, the thickness of the material is selected so that if the antenna is detuned by the use of the material, the original antenna design takes this detuning into consideration. Thus, by providing a known spacing material between the antenna and the wall, one automatically eliminates detuning as a problem.

Note that if one simply provided an antenna designed for free space and put it against a wall, the system would not work appropriately because the wall would detune the antenna. In the subject invention, one places absorbent material against the front surface of the antenna and designs the antenna to maintain the desired frequency response. If one is utilizing a 915-MHz radar and one places an insert having an index of refraction of 3 in front of it, then the entire antenna is designed so that it will have the required resonant frequency. The detuning effect caused by the wall will be significantly reduced and the effect of the wall reflection on the receiver will be reduced.

The result of utilizing a quad-type panel antenna spaced a half of a wavelength from a concrete wall is that one can readily obtain a ring of detection at least 20 feet inside the wall.

While it is recognized that if one is in the far field, meaning that the antenna is offset from the wall by, for instance, 10 feet, any type of antenna such as a YAGI on a tripod would work. However, as mentioned before, the stabilization of the YAGI with a tripod is not easy in the field and the antenna itself is quite large. With the subject antenna, one stabilizes the antenna by pressing it against the immovable wall. Note that the insert removes both the deleterious effects of detuning and the effect of the wall-reflected energy.

In one embodiment, the antenna having the quad-type structure is 25 inches square. However, when utilizing the subject absorber material in between the flat panel antenna and the wall, one can utilize a single 900-MHz patch of about 8 inches by 8 inches and nonetheless be able to detect movement behind the wall to approximately 10 feet.

In summary, a flat panel antenna used at a wall in a through-the-wall CW radar application is spaced from the wall by a half wavelength to eliminate the effects of the discontinuity associated with the wall to prevent receiver swamping and thus limit receiver dynamic range. In one embodiment, a dielectric absorbing material is placed adjacent the flat panel antenna, which allows the flat panel antenna to be pressed against the wall for antenna stabilization, with the index of refraction of the material desirably being approximately 3.

BRIEF DESCRIPTION OF THE DRAWINGS

These and other features of the subject invention will be better understood in connection with the Detailed Description, in conjunction with the Drawings, of which.

DETAILED DESCRIPTION

Prior to describing the subject invention and by way of background, in order to obtain a through-the-wall motion detector capable of easily detecting a person within a room, is has been found that one can detect these individuals because they are typically in motion. To detect individuals behind a wall, the through-the-wall system employs a simple CW radar with a directional antenna. In one embodiment, the transmitter for this CW radar employs a circulator that is coupled to a directional antenna so that a CW beam is projected through the wall and into the room. Returns from the CW beam arrive at the same antenna and are split off by the circulator. A reduced power replica from the transmitted signal is mixed with the returns from the antenna. Changes in the phase difference between the two signals indicate motion, and thus the presence of an individual behind the wall. In one embodiment, the summing is performed at a mixer, with slight phase differences indicating motion of an object behind a wall. Thus, if there is anything behind the wall that is moving, and recognizing that people normally move, the system will detect them.

In one embodiment, the CW radar transmitter includes a frequency source coupled to a power divider, with one output of the power divider coupled to the circulator and thence to a directional antenna. This antenna may be a YAGI. However, it is well known that such an antenna has a back lobe response that makes it susceptible to motion from the operator or other moving objects near the antenna, thus making it more difficult to determine moving objects behind the wall. In addition, a YAGI antenna may become detuned when placed close to a wall.

In the through-the-wall system, a planar antenna may be used having spaced-apart patches over a ground plane. This type antenna has minimum back lobes and therefore does not create the same potential confusion between moving objects near the antenna and those behind the wall.

While some frequencies are better than others for wall penetration, it has been found that a signal in the 900 MHz band is optimal for detecting motion behind most walls. However, systems using higher frequencies are effective for longer standoff ranges through lower density walls and lower frequency units are indicated for more dense walls.

Figure 1:
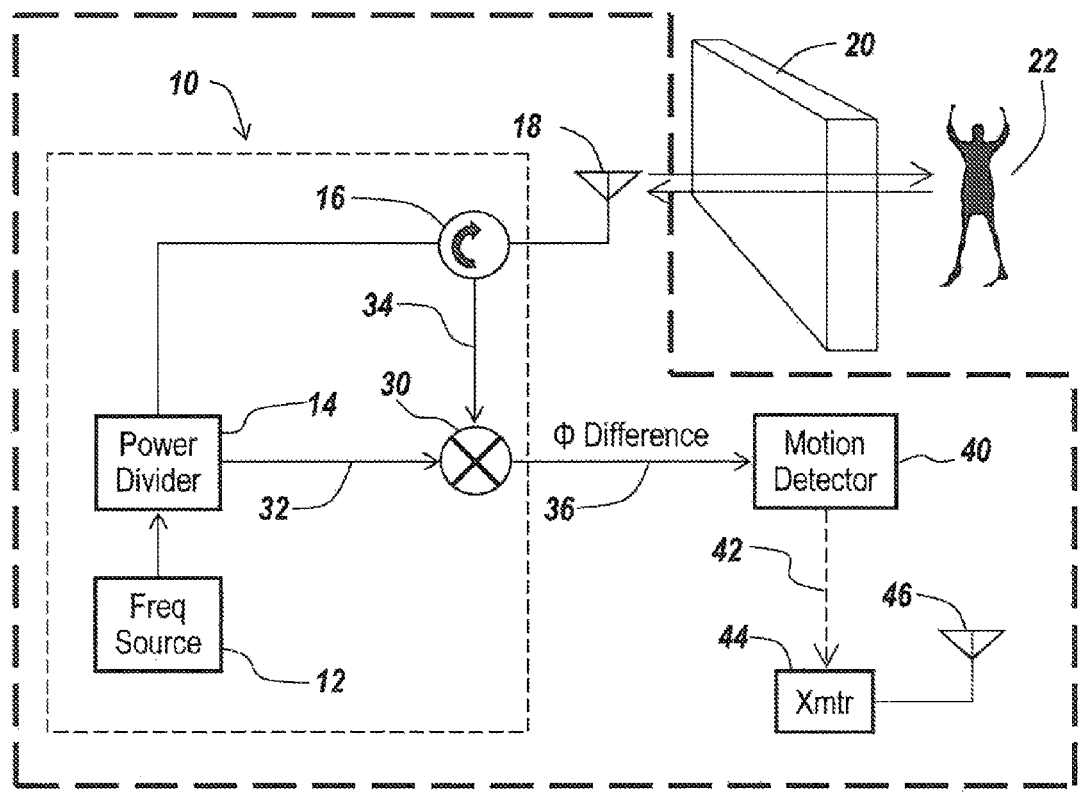
FIG. 1 is a diagrammatic illustration of a prior art single-frequency CW radar for use in through-the-wall applications.

Referring now to FIG. 1, such a through-the-wall system is described. Here a CW radar 10 includes a frequency source 12, a power divider 14, a circulator 16 coupled to an antenna 18 and a mixer 30. Preferably, the antenna is a directional antenna so as to project all of the energy in a given direction, in this case through a wall 20, so as to be able to ascertain whether a moving object such as individual 22 exists behind the wall.

In one embodiment, the radar is a single frequency radar set optimally to 900 MHz.

Figure 2:
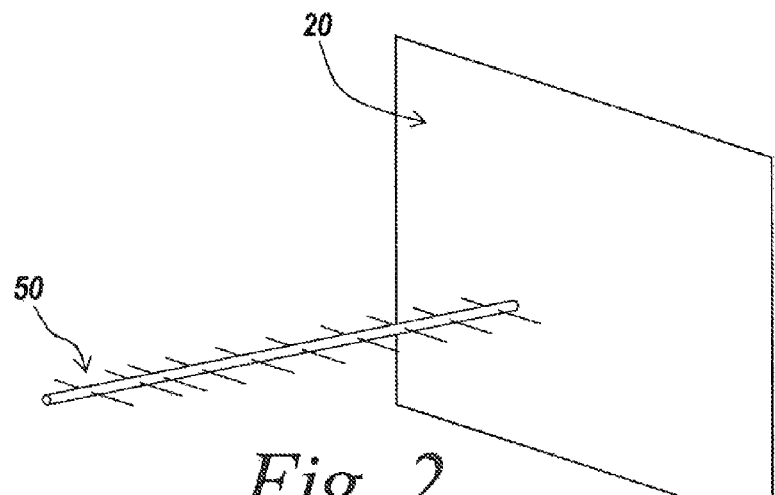
FIG. 2 is a diagrammatic illustration of a prior art YAGI antenna in proximity to a wall for use with the single-frequency radar of FIG. 1.

In a prior embodiment, illustrated in FIG. 2, antenna 18 is a YAGI antenna 50, with 13 dB forward gain mounted in proximity to wall 20. As mentioned above, this type of antenna is large, not easily portable and must be mounted against movement, usually through the use of a tripod.

Figure 3:
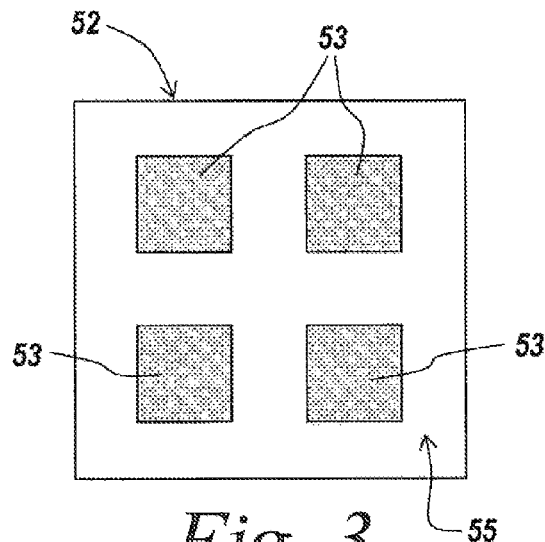
FIG. 3 is a diagrammatic illustration of a prior art flat panel antenna.

In another embodiment, illustrated in FIG. 3, antenna 18 is a flat panel antenna 52 with conductive elements or patches 53 arranged in a quad configuration and insulated from a ground plane 55. This antenna configuration may be used to eliminate back lobes and is lighter and more easily transportable than the YAGI.

In one embodiment, patches 53 are rectilinear, measuring 5 by 7 inches. Optimally the elements or patches are spaced by a little under a wavelength, i.e., 0.8 wavelength. The overall size of the antenna in one embodiment is 25 by 25 inches, which corresponds to the outside dimension of ground plane 55.

Figure 4:
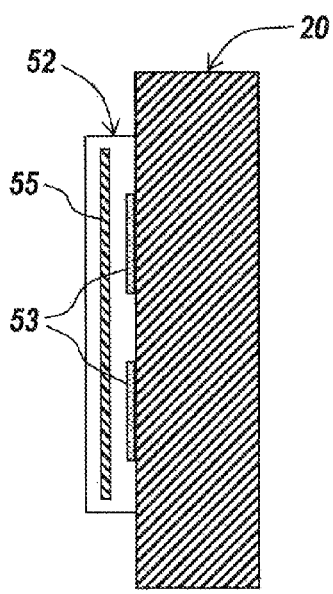
FIG. 4 is a diagrammatic illustration of the prior art antenna of FIG. 3 applied to a wall; and, FIG. 5 is a diagrammatic illustration of an improved antenna of the subject invention, illustrating the spacing of the antenna from the wall through the utilization of an absorbing material that spaces the antenna one-half wavelength from the wall.

Referring to FIG. 4, antenna 22 is shown pressed against a wall 20, with patches 53 in direct contact with the wall. Note that in this operational configuration the wall presents the aforementioned discontinuities and results in both detuning and reflections.

In one embodiment, radar 10 is a single frequency radar with frequency source 12 set optimally to 900 MHz.

Referring again to FIG. 1, one output of power divider 14 is coupled to circulator 16, which is coupled to antenna 18. The antenna forms CW beam 24, which penetrates wall 20. Signal 26 reflected from moving object 22 behind the wall is received by antenna 18 and is sent to circulator 16. Circulator 16 passes reflected signal 26 to mixer 30 as signal 34.

Power divider 14 divides the power of frequency source 12 to provide a phase reference signal 32 to mixer 30. The mixer combines signals 32 and 34 to derive a phase difference signal 36 to motion detector 40. Phase difference signal 36 is also commonly known as the Doppler signal, signifying motion of object 22 with respect to radar 10.

It is the function of motion detector 40 to ascertain when a change in phase difference signal 36 exceeds a predetermined threshold. When this occurs, a moving object behind wall 20 is indicated. Motion detector 40 may have a local alarm or display screen.

In an alternate embodiment, as indicated by dotted line 42, the output of motion detector 40 may be sent to transmitter 44 and by antenna 46 to a remote location.

In another embodiment, as disclosed in the referenced patent application entitled "Combined Radar and Communications Link," the same CW radar is used to also send the detection report to a remote location.

Using a YAGI antenna, for example, the unit may be set up on a tripod near the exterior wall of a building. Motion behind the wall can then being detected at a distance from the building, either to protect troops or police from hostile action or to protect monitoring individuals from, for instance, the heat of a fire.

Illustrated in FIG. 2 is a YAGI type antenna. This antenna has a substantial back-lobe response and my be difficult or impossible to use in many situations. In addition, a YAGI antenna may become detuned when placed close to a wall.

FIG. 3 illustrates flat panel antenna 52 that has a minimal back-lobe response. However, its performance will vary depending on the wall material and the method of construction. Reflection of energy from a wall may be an issue. FIG. 4 illustrates antenna 52 placed upon wall 20 for detection of motion inside a building.

Figure 5:
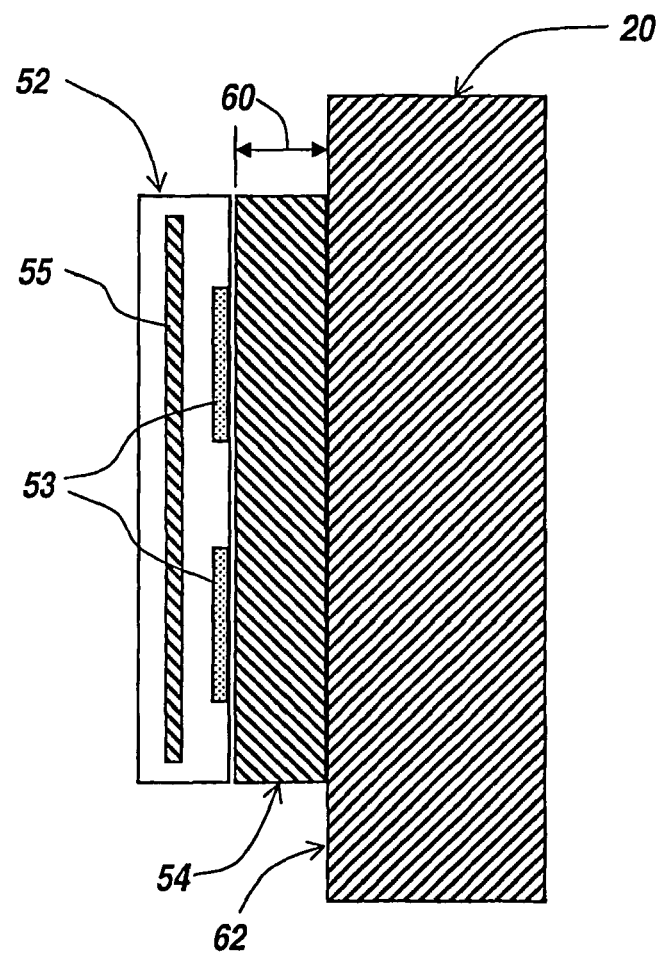

In order to solve problems associated with the direct proximity of the flat panel antenna to the wall and referring to FIG. 5, an additional layer 54 is interposed between antenna 52 and wall 20. The thickness and material of this layer depends on the electromagnetic properties of the wall and the antenna. Optimum detection of moving objects behind occurs when the following criteria are met:

1. the thickness of this layer is ½ wavelength in the spacer of the CW radar frequency; and the refractive index of the spacer (n) is less than the refractive index of the wall; and 2. The antenna is not detuned from the radar frequency of operation.

As discussed above, the desirable refractive index of material 54 is on the order of 3, with a range of refractive indices being within the scope of the subject invention. The thickness 60 of layer 54 is to be on the order of one-half the free space wavelength of the desired CW radar frequency divided by n.

It is the purpose of this insert, with a refractive index higher than that of air, to minimize the effect of reflections from wall face 62 of wall 20 into the antenna. By virtue of the half-wave spacing, the inverted reflections will be phase canceled with the outgoing wave at the antenna, thus to dramatically reduce the required dynamic range of the radar's receiver, and concomitantly to increase the range at which moving individuals can be detected on the other side of the wall.

Moreover, the use of the insert fixes the antenna to the wall so that the antenna does not move during the process. The use of the insert also eliminates detuning that would otherwise be caused by the proximity of the antenna to the wall, with the antenna being designed to accommodate the electrical characteristics presented by the insert.

With a directive antenna such as that described, it has been found that moving objects can be detected to as much as 20 feet from the wall on the side of the wall opposite the antenna with a 12-inch thick concrete wall.

It is also noted that antenna 52 can be configured with a single patch and when using the subject insert can be used to detect movement on the other side of the wall to within 10 feet.

In either configuration the insert permits pressing the antenna to the wall by hand without the deleterious effects associated with having no insert, and provides much improved performance of the system.

In many practical situations, walls of different materials are encountered and no single matching layer is optimum. In this case it will be to advantage to have several matching layers available to span the range of wall materials.

What has therefore been provided is an extremely simple system for improving the performance of a through-the-wall motion detection system.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to an, single embodiment, but rather construed in breadth and scope in accordance with the recitation of the appended claims.

What is claimed is:

1. In a through-the-wall CW radar system including a flat panel antenna, a method for reducing the dynamic range requirements of the receiver in the CW radar, comprising the step of:
    spacing the flat panel antenna from a wall by interposing a dielectric absorbing material insert between the antenna and the wall to space the antenna from the wall, the spacing being by an amount that causes cancellation of a CW signal reflected by the wall with the signal from the antenna.

2. The method of claim 1, wherein the insert has a thickness and wherein the thickness of the insert is one-half wavelength based on the frequency of the CW radar.

3. The method of claim 1, wherein the insert has an index of refraction greater than one and less than that associated with the wall.

4. The method of claim 3, wherein the index of refraction of the insert material is greater than 2.

5. The method of claim 3, wherein the index of refraction of the insert material is approximately 3.

6. In a through-the-wall CW radar system having a portable CW radar and a flat panel antenna, a method for providing robust detection and measurements of movement behind the wall, comprising:
    stabilizing the antenna from movement relative to a wall by interposing an insert between the antenna and the wall, the refractive index of the insert being less than the refractive index of the wall; and,
    pressing the antenna towards the insert such that the position of the antenna with respect to the wall is maintained fixed.

7. In a through-the-wall CW radar system having a portable CW radar and a flat panel antenna, a method for providing robust detection and measurements of movement behind the wall, comprising:
    stabilizing the antenna from movement relative to the wall by interposing an insert between the antenna and the wall, the insert separating the antenna from the wall by a distance that ensures that the CW signal reflected by the wall is 180° out of phase with the signal transmitted by the antenna at the antenna; and,
    pressing the antenna towards the insert such that the position of the antenna with respect to the wall is maintained fixed.

8. The method of claim 7, wherein the phase shift of the signal traveling a distance D from the antenna to the wall is given by 360 *n*D/wavelength, where n is the index of refraction of the insert.

9. The method of claim 8, wherein D is the thickness of the insert and wherein D is selected so that the phase shift of the signal through the material will have a 180° phase shift relative to the transmitted signal.

10. The method of claim 9, wherein for the 180° phase shift the thickness of the insert is lambda/(2*n), wherein lambda is the wavelength of the signal from the CW radar.

11. In a through-the-wall CW radar system having a portable CW radar and a flat panel antenna, a method for providing robust detection and measurements of movement behind the wall, comprising:
    stabilizing the antenna from movement relative to a wall by interposing an insert between the antenna and the wall, the refractive index of the insert being less than the refractive index of the wall; and,
    pressing the antenna towards the insert such that the position of the antenna with respect to the wall is maintained fixed, the insert having the effect of lowering the resonant frequency of the antenna, and further including the step of designing the antenna so that it resonates at a desired frequency with said insert in place.

12. The method of claim 11, wherein the antenna dimensions for the resonant frequency of an antenna without the insert are reduced to accommodate the interposition of the insert.

13. An antenna system for use with a through-the-wall CW radar used for the detection of motion of an object behind a wall, comprising:
    a flat panel antenna; and,
    a dielectric spacer positioned to one side of said flat panel antenna, said spacer having a material and a thickness that phase shifts a signal reflected by the wall by 180° such that the reflected signal is phase canceled with the signal transmitted by the antenna.

14. An antenna system for use with a through-the-wall CW radar used for the detection of motion of an object behind a wall, comprising:
    a flat panel antenna; and,
    a dielectric spacer positioned to one side of said flat panel antenna, said spacer having a material and a thickness that phase shifts a signal reflected by the wall by 180° such that the reflected signal is phase canceled with the signal transmitted by the antenna, said spacer having a material that has a reflection coefficient greater than one and less than that associated with the wall.

15. The apparatus of claim 14, wherein the reflection coefficient of the spacer is greater than 2.

16. The apparatus of claim 14, wherein the reflection coefficient of the spacer is approximately 3.

17. The apparatus of claim 14, wherein said flat panel antenna includes a single patch element.

18. The apparatus of claim 14, wherein said antenna includes a quad array of patch elements.

19. The apparatus of claim 18, wherein said patch elements are separated one from the other by a little under one-half of a wavelength from the signal from the CW radar.

* * * * *